United States Patent
Behm

(10) Patent No.: US 10,071,719 B2
(45) Date of Patent: Sep. 11, 2018

(54) HYDROSTATIC TRACTION DRIVE IN CLOSED HYDRAULIC CIRCUIT AND METHOD FOR CONTROLLING THE HYDROSTATIC TRACTION DRIVE

(71) Applicant: Robert Bosch GmbH, Stuttgart (DE)

(72) Inventor: Martin Behm, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 555 days.

(21) Appl. No.: 14/676,761

(22) Filed: Apr. 1, 2015

(65) Prior Publication Data

US 2015/0274149 A1    Oct. 1, 2015

(30) Foreign Application Priority Data

Apr. 1, 2014 (DE) ........................ 10 2014 206 123

(51) Int. Cl.
| | |
|---|---|
| *F16H 47/02* | (2006.01) |
| *B60T 10/00* | (2006.01) |
| *B60W 10/196* | (2012.01) |
| *B60T 1/08* | (2006.01) |
| *B60T 8/1761* | (2006.01) |
| *B60T 10/04* | (2006.01) |
| *B60T 13/58* | (2006.01) |
| *F16H 61/4157* | (2010.01) |

(52) U.S. Cl.
CPC ............ *B60W 10/196* (2013.01); *B60T 1/08* (2013.01); *B60T 8/17616* (2013.01); *B60T 10/04* (2013.01); *B60T 13/585* (2013.01); *F16H 61/4157* (2013.01)

(58) Field of Classification Search
CPC ........ B60T 10/04; F16H 61/478; F16H 61/47; F16H 61/462; F16H 61/46; F16H 61/40; F16H 61/4157
See application file for complete search history.

(56) References Cited

U.S. PATENT DOCUMENTS

| | | | | |
|---|---|---|---|---|
| 5,042,251 A | * | 8/1991 | Berthold | ............... F16H 61/431 60/448 |
| 5,435,131 A | * | 7/1995 | Hausman | .............. F16H 61/425 60/327 |
| 6,135,231 A | * | 10/2000 | Reed | ........................ B62D 9/00 180/307 |
| 6,260,440 B1 | * | 7/2001 | Cronin | .................... F16H 47/04 475/76 |
| 7,874,153 B2 | * | 1/2011 | Behm | ................. B60W 10/196 60/464 |
| 2003/0111288 A1 | * | 6/2003 | Pellenc | ................ B60K 28/165 180/308 |

(Continued)

FOREIGN PATENT DOCUMENTS

| | | |
|---|---|---|
| DE | 44 07 282 A1 | 9/1995 |
| DE | 198 52 039 A1 | 5/2000 |
| WO | 2007/073892 A1 | 7/2007 |

*Primary Examiner* — Thomas E Lazo
*Assistant Examiner* — Dustin T Nguyen
(74) *Attorney, Agent, or Firm* — Maginot, Moore & Beck LLP

(57) ABSTRACT

A hydrostatic traction drive in a closed hydraulic circuit includes two hydraulic machines in the closed hydraulic circuit and a control unit configured to control a braking torque of the traction drive. A method for controlling the hydrostatic traction drive includes controlling the braking torque for the hydrostatic traction drive.

16 Claims, 2 Drawing Sheets

(56) References Cited

U.S. PATENT DOCUMENTS

| | | | |
|---|---|---|---|
| 2004/0178673 A1* | 9/2004 | Magnien | B60T 13/585 |
| | | | 303/11 |
| 2006/0230920 A1* | 10/2006 | Berg | B60W 30/1819 |
| | | | 91/499 |
| 2008/0262688 A1* | 10/2008 | Behm | B60T 8/1766 |
| | | | 701/70 |
| 2014/0075930 A1* | 3/2014 | Maiyur | F04B 13/00 |
| | | | 60/327 |
| 2014/0372000 A1 | 12/2014 | Rozycki et al. | |
| 2014/0372001 A1 | 12/2014 | Rozycki et al. | |

* cited by examiner

HYDROSTATIC TRACTION DRIVE IN CLOSED HYDRAULIC CIRCUIT AND METHOD FOR CONTROLLING THE HYDROSTATIC TRACTION DRIVE

This application claims priority under 35 U.S.C. § 119 to patent application no. DE 10 2014 206 123.7, filed on Apr. 1, 2014 in Germany, the disclosure of which is incorporated herein by reference in its entirety.

BACKGROUND

The disclosure relates to a hydrostatic traction drive in a closed hydraulic circuit and a method for controlling the hydrostatic traction drive.

A generic hydrostatic traction drive has a hydraulic pump and a hydraulic motor, which are connected to each other in a closed hydraulic circuit by means of two hydrostatic working lines. The hydraulic pump can be coupled to a drive machine, for example a diesel engine, and the hydraulic motor can be coupled for example to at least one wheel to be driven or at least one axle to be driven.

There are various methods for using the closed circuit of the traction drive not only for driving, but also for hydraulic braking. In particular, with slow moving vehicles it is known to support the hydraulic pump in the overrun mode of the drive machine in order to utilize the braking effect of the drive machine. The braking power that can be achieved in this way is however limited by the maximum possible braking power of the drive machine. It is therefore important to protect the drive machine against overload resulting from the support.

It is known from the publication DE 198 92 039 A1 to couple a second variable hydraulic pump to a drive shaft of the hydraulic pump. The same is disposed in an open circuit and is configured to feed in just one direction. In cases of a braking process, the hydraulic motor changes to pumping mode and thus drives the two hydraulic pumps. The pressure medium delivered by the second hydraulic pump is then released back into a tank by means of a pressure relief valve. The volumetric flow to the pressure relief valve is limited here by a valve, which feeds a greater volumetric flow to the pressure relief valve with increasing operation of a brake pedal. In this way part of the braking energy is no longer taken up by the drive machine, but is converted into heat at the pressure relief valve.

The publication EP 1960 699 A1 provides a solution with a pressure relief valve, by means of which braking energy can be converted into heat. However, the pressure relief valve is not disposed for this purpose in an extra open circuit provided with a hydraulic pump for this, but during braking pressure medium from the working line downstream of the hydraulic motor is released by means of the pressure relief valve into the other working line, which has the lower pressure, or is released back into the tank. Moreover, during braking the feed volume of the hydraulic pimp is reduced to a so-called braking feed volume and the suckback volume of the hydraulic motor is increased to a braking suckback volume that is dependent on the strength of the braking force demanded by the driver.

The solutions mentioned have in common that the activation of the hydraulic braking has to be actively carried out by the driver or operator.

The disadvantage is that said dependency on the operator/driver is a potential source of error and human failure cannot be ruled out. The discussed overload of the drive machine or accidents can thus occur as a result of late or insufficient deceleration.

SUMMARY

By contrast, the object of the disclosure is to provide a hydrostatic traction drive with a more reliable braking function. Furthermore the object of the disclosure is to provide a control method for the hydrostatic traction drive.

The first object is achieved with a hydrostatic traction drive with the features of the disclosure and the second object is achieved by a method for controlling the traction drive with the features of the disclosure.

Advantageous developments of the traction drive and of the method are described in the dependent claims.

A hydrostatic traction drive has a first hydraulic machine, which is configured in particular as a hydraulic pump, with variable displacement volume and a second hydraulic machine, which is configured in particular as a hydraulic motor, with constant or variable displacement volume. Both hydraulic machines are fluidically connected in a closed hydraulic circuit by means of a first branch line and a second branch line, in particular for the pressure medium supply of the second hydraulic machine. Here the first hydraulic machine can be coupled, in particular is coupled, to a drive machine, in particular to an internal combustion engine, for example a diesel engine, and the second hydraulic machine can be coupled, in particular is coupled, to a wheel to be driven or a chain or an axle to be driven. According to the disclosure, the traction drive comprises a control unit that is configured such that at least an "overrun mode" drive state can be determined by means thereof from possible drive states of the traction drive depending on an actual value of a revolution rate of the second hydraulic machine and on a theoretical value of said revolution rate. Based on this, a braking torque of the traction drive can be controlled by means of the control unit depending on the determined drive state.

By means of the control unit according to the disclosure, at least the overrun mode drive state can be reliably detected, whether the traction drive is in a braking drive state (overrun mode) or in a driving drive state (traction mode), without a pressure measurement in the closed hydraulic circuit being necessary. By means of the determination according to the disclosure of the overrun mode, thus a braking function can no longer only be automatically activated by means of the control unit in the event of changing requirement of the operator or driver, but also in the event of changing ambient conditions, such as occur for example when travelling over undulating terrain. This allows any discrepancy between a demand by the operator or driver and the actual drive state of the traction drive to be automatically counteracted. This allows a more reliable braking function of the traction drive to be provided and potential sources of error because of a lack of braking and in particular human error to be better prevented. In particular, overloading of the drive machine, such as can occur for example when travelling on a gradient, can thereby be automatically prevented. The solution presented enables automatic hill descent control and not least an increase in ride comfort. Simple integration in an existing drive program of the traction drive is possible.

The theoretical value of the revolution rate mentioned can be determined by means of the control unit, preferably assuming no losses.

The displacement volume of the first hydraulic machine can preferably be adjusted electroproportionally. The same applies to the second hydraulic machine if it has an adjustable displacement volume.

The traction drive can of course comprise more than one second hydraulic machine for driving multiple wheels, chains or axles.

The traction drive is preferably installed in a mobile working machine.

In addition to the evaluated revolution rate of the second hydraulic machine, in a preferred development the control unit is configured such that the overrun mode can additionally be determined depending on a difference of an actual value of a revolution rate of the drive machine and a target value of said revolution rate.

The braking torque is preferably produced hydraulically, in particular by means of the hydraulic circuit, and preferably acts on a drive shaft of the second hydraulic machine.

In a preferred development, the braking torque can be produced by means of a restriction of the partial flow of a return volumetric flow directed from the second hydraulic machine to the first hydraulic machine. Because a theoretically achievable braking torque that is based on the conversion of the efficiency levels of the hydraulic machines contained within the circuit—hydraulic pump and hydraulic motor—lies above a maximum drive torque of the drive machine in this case, and as a rule can only be achieved without additional components by suitable adjustment of the displacement volumes of the two hydraulic machines, a braking capability of the hydrostatic traction drive can thus be utilized in a particularly simple way in terms of the technology of the device.

For the mentioned restriction, in a preferred development the traction drive comprises a hydraulic restriction means whose pressure medium input can be fluidically connected, in particular is connected, to the second branch line and whose pressure medium output can be fluidically connected, in particular is connected, to a pressure medium sink of the traction drive. The restriction means can for example be a throttle valve or a pressure relief valve. In the case in which a direction of rotation of the second hydraulic machine can be reversed, the traction drive preferably also comprises such a hydraulic restriction means for the first branch line.

The directions of rotation of the hydraulic machines are preferably reversible, so that the traction drive can be operated in both directions of travel. This also means that with said reversal the first branch line that was previously acting as a forward feed line fulfils the function of a return line following the reversal and vice-versa.

In a preferred development, the overrun mode and in particular its intensity can be determined by means of the control unit depending on a deviation of the actual value of the revolution rate of the second hydraulic machine from the theoretical value of said revolution rate.

The intensity of the overrun mode is to be understood to mean how much the second hydraulic machine is reduced relative to the theoretical revolution rate because of the ambient conditions, for example the gradient. In this case the deviation is preferably a measure of a hydraulic slip of the second hydraulic machine.

The control unit is preferably designed such that by means thereof the theoretical value can be determined by the control unit while neglecting at least one volumetric efficiency level of the two hydraulic machines, in particular while neglecting the volumetric efficiency levels of both hydraulic machines.

In a preferred development, the theoretical value can be determined by means of the control unit depending on an actual value of a revolution rate of the first hydraulic machine or on a revolution rate that can be derived therefrom, in particular on the actual value of the revolution rate of the drive machine, and depending on a ratio of actual values of displacement volumes of the hydraulic machines. The determination of said variables is simple in terms of device technology and methodology compared with the determination and processing of pressures in the working lines.

In a preferred development, the actual values of the displacement volumes can be detected by means of detecting units of the traction drive, for example a displacement detecting unit or an angle detecting unit.

If such a detecting unit were not to be provided for one of the hydraulic machines, then in a preferred version the actual value of the displacement volume can be detected by means of the control unit as a function of a target value of the displacement volume involved, in particular by computation.

For this purpose a characteristic field or a function of the actual value of the displacement volume depending on the target value of said displacement volume is preferably stored in the control unit. In this case the target value of the displacement volume is proportional to the applied control current for electroproportional control of the corresponding hydraulic machine. Said theoretical determination of the actual value of the displacement volume is practicable because the displacement volumes of the two hydraulic machines are not measured as a rule. In this case a clear idea of the relationship between the target value and the actual value of the displacement volume is advantageous, because deviations have a direct effect on the accuracy of the theoretical revolution rate determined in this way and hence on the control of the braking torque.

For providing the values required for determination of the theoretical revolution rate, in a preferred development the traction drive comprises a first revolution rate detection unit, by means of which an actual value of a revolution rate of the first hydraulic machine, or a revolution rate that can be derived therefrom, can be detected. Alternatively or in addition, the traction drive comprises a second revolution rate detection unit, by means of which the actual value of the revolution rate of the second hydraulic machine can be detected.

A method according to the disclosure for controlling a braking torque of a hydrostatic traction drive, as configured according to at least one of the aspects of the preceding description, comprises at least a step "determining the overrun mode of the traction drive depending on the actual value of the revolution rate of the second hydraulic machine and on the theoretical value of said revolution rate" and a step "controlling the braking torque depending on the result of the determination". The two steps are preferably carried out in this case by means of the already described control unit of the traction drive.

The step "determining the overrun mode of the traction drive depending on the actual value of the revolution rate of the second hydraulic machine and on the theoretical value of said revolution rate" preferably takes place at least by means of a step "determining a deviation of the actual value of the second hydraulic machine from the theoretical value of said revolution rate". Using the determined deviation, a conclusion is drawn in a simple manner regarding the drive state of the second hydraulic machine—driven or decelerated. The result can for example be used in order to activate or deactivate a braking function as described in the preceding description or in the publication WO 2007 073 892 A2.

The steps "detecting the actual value of the revolution rate of the second hydraulic machine" and "determining the theoretical, in particular loss-free, value of said revolution rate" preferably take place prior to the step "determining the deviation of the actual value of the second hydraulic machine from the theoretical value of said revolution rate". As already mentioned, the determination of the theoretical value preferably takes place in this case while neglecting the volumetric efficiency level of at least one of the two hydraulic machines.

In a preferred development, the step "determining the theoretical, in particular loss-free value of said revolution rate" is carried out depending on an actual value of a revolution rate of the first hydraulic machine, or on a revolution rate that can be derived therefrom, and depending on a ratio of actual values of displacement volumes of the hydraulic machines.

In a preferred development, the step "controlling the braking torque depending on the result of the determination" is carried out at least by means of a step "adjusting at least one of the displacement volumes of the hydraulic machines".

The method according to the disclosure is preferably stored for implementation in a memory unit of the already mentioned control unit of the traction drive.

BRIEF DESCRIPTION OF THE DRAWINGS

An exemplary embodiment of a hydrostatic traction drive according to the disclosure and a method according to the disclosure for controlling said traction drive are explained in detail below in two figures. In the figures.

DETAILED DESCRIPTION

Figure 1:
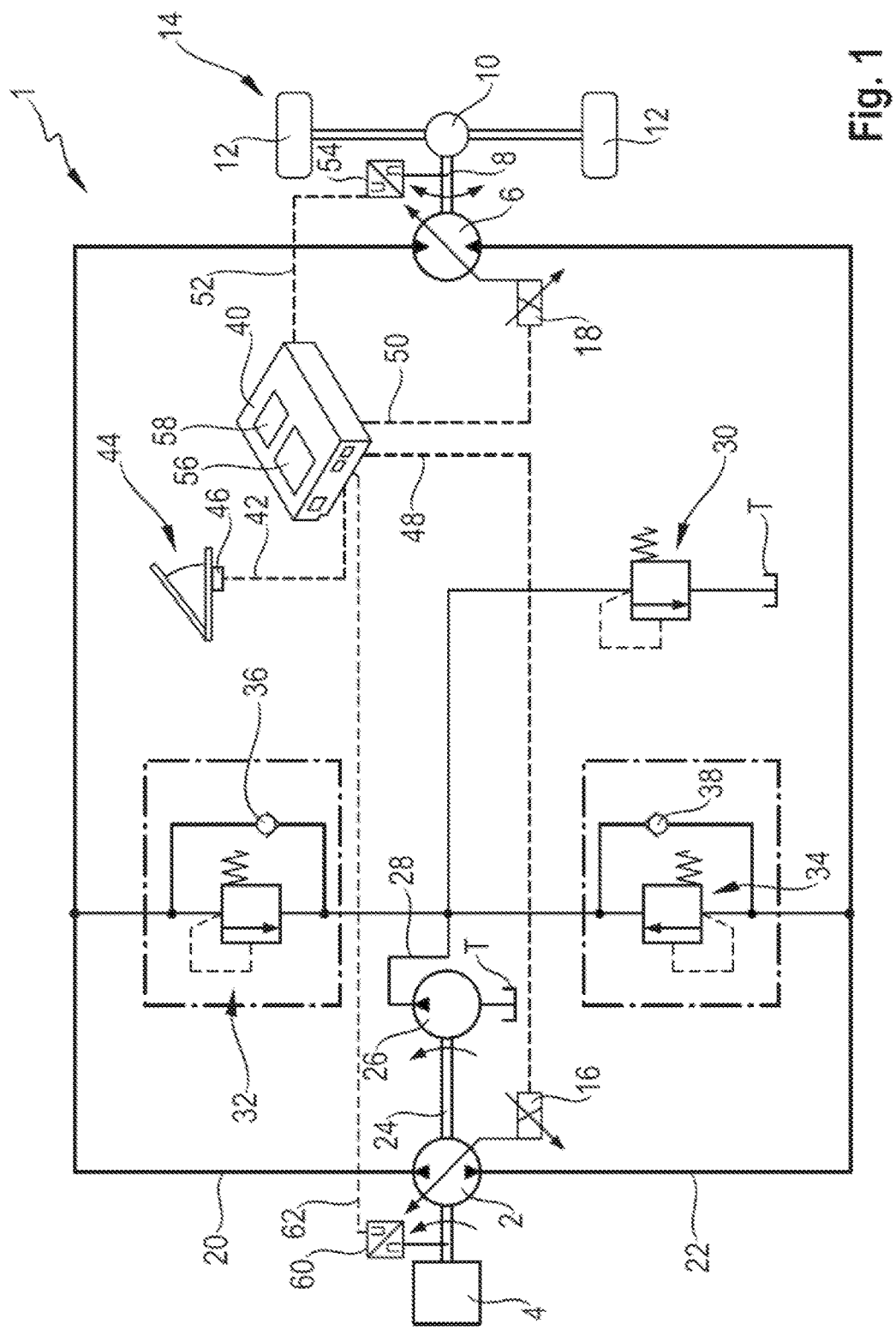
FIG. 1 shows a hydraulic circuit diagram of the traction drive.

According to FIG. 1 a hydrostatic traction drive 1 has a first hydrostatic hydraulic machine 2, which is primarily operated as a hydraulic pump and is driven by a drive machine 4 that is embodied as a diesel engine. Furthermore, the hydrostatic traction drive 1 has a second hydrostatic hydraulic machine 6 that is coupled by means of a drive shaft 8 to an axle 14 having two wheels 12 and that is primarily operated as a hydraulic motor. Both hydraulic machines 2, 6 are each adjustable in their displacement volume by means of an adjustment unit 16, 18. The first hydraulic machine 2 is fluidically connected in a closed hydraulic circuit to the second hydraulic machine 6 by means of a first branch line 20, which is the feed line in the following discussions, via which pressure medium flows from hydraulic machine 2 to hydraulic machine 6, and via a second branch line 22, which is the second branch line in the following discussions, via which pressure medium flows from hydraulic machine 6 to hydraulic machine 2.

The hydrostatic traction drive 1 has a feed pump 26 connected to a drive shaft 24 of the first hydraulic machine 2, which can deliver pressure medium from a tank T into a feed line 28. The latter divides into three branches, wherein a first branch can be brought into a pressure medium connection with the tank T by means of a pressure relief valve 30. A second or third branch can be brought into a pressure medium connection with branch line 20 or with branch line 22 by means of pressure relief valve 32 or pressure relief valve 34, each comprising an integrated anti-suckback valve 36 or 38.

Both hydraulic machines 2, 6 can be operated in all four quadrants, so that both the flow direction of the pressure medium in the closed hydraulic circuit as well as the direction of rotation of each hydraulic machine 2, 6 is reversible.

The hydrostatic traction drive 1 has a control unit 40, to which a brake operating pedal 44 is connected by means of a signal line 42. The brake operating pedal 44 has a sensor 46 by means of which an actuation force of the brake operating pedal 44 can be detected and transmitted to the control unit 40 by means of the signal line 42. The control unit 40 is connected by means of an electrical signal line 48 to the adjustment device 16 of the hydraulic machine 2 and by means of an electrical signal line 50 to the adjustment device 18 of the hydraulic machine 6. A revolution rate detection unit 54, by means of which the revolution rate of the second hydraulic machine 6 can be detected on the drive shaft 8, is connected by means of an electrical signal line 52 to the control unit 40. A revolution rate detection unit 60, by means of which the revolution rate of the first hydraulic machine 2 can be detected on its drive shaft, is connected to the control unit 40 by means of an electrical signal line 62. The control unit 40 has a memory unit 56, in which a method according to the disclosure is stored according to the preceding description, and a processor unit 58, in which the method can be carried out.

Figure 2:
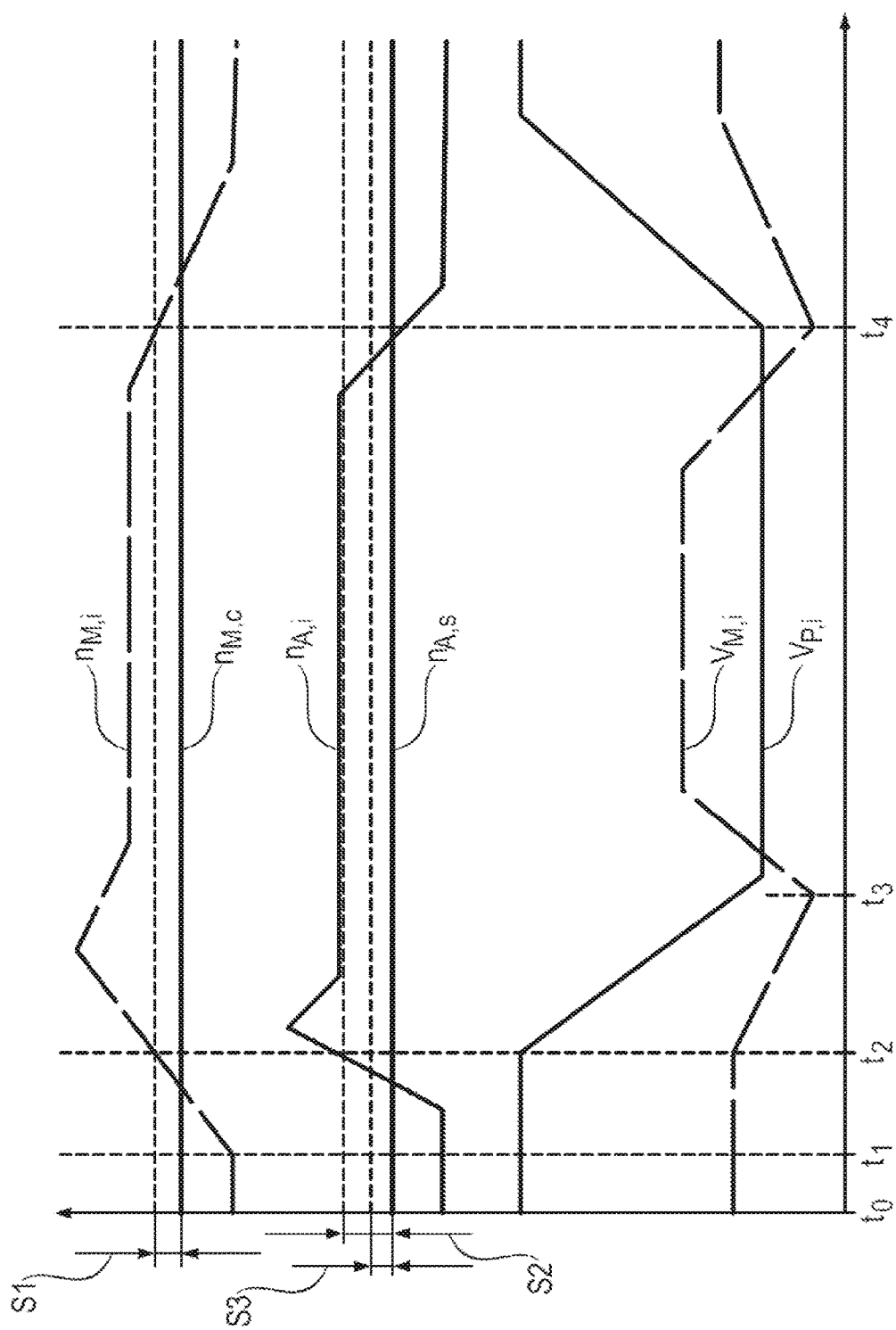
FIG. 2 shows a revolution rate-volumetric-flow time diagram of the traction drive according to FIG. 1, which results from control of the traction drive based on the method.

FIG. 2 shows, summarized in a diagram, a time profile of an actual value $n_{M,i}$, and of a theoretical value $n_{M,c}$ of the revolution rate $n_M$ of the second hydraulic machine 6, a time profile of an actual value $n_{A,i}$, and of a target value $n_{A,s}$ of the revolution rate $n_A$ of the drive machine 4 specified by the operator by means of the brake operating pedal 44 and a time profile of an actual value $V_{M,i}$ of the displacement volume $V_M$ of the second hydraulic machine 6 and of an actual value $V_{P,i}$ of the displacement volume $V_P$ of the first hydraulic machine 2. The value $n_{M,c}$ is determined for this by means of the control unit 40 according to FIG. 1 by means of the relationship $$n_{M,c}=n_{P,i}V_{P,i}/V_{M,i}$$

assuming no losses. Here $n_{P,i}$, is the actual value of the revolution rate $n_P$ of the first hydraulic machine 2 detected by means of the revolution rate detection unit 60 according to FIG. 1 and corresponds to the actual value $n_{A,i}$ of the revolution rate $n_A$ of the drive machine 4 because of the coupling of the drive shafts of the drive machine 4 and the first hydraulic machine 2. A proportional relationship can also exist here because of a gearbox being interposed. In FIG. 2, in addition the deviation ($n_{M,i}-n_{M,c}$) determined by the control unit 40 is plotted at a point in time $t_2$. Starting from a point in time $t_0$, all plotted values $n_{M,i}$, $n_{M,c}$, $n_{A,i}$, $n_{A,s}$, $V_{M,i}$, $V_{P,i}$, are constant. The traction drive 1 is operating in a stationary manner, as is the case for example during horizontal straight ahead travel without acceleration or braking.

At a point in time $t_1$ the vehicle driven by the traction drive 1 according to FIG. 1 is now travelling on a slope and changes to the overrun mode. Regardless of the slope, the theoretical value $n_{M,c}$ of the revolution rate $n_M$ of the second hydraulic machine 6 and the target value $n_{A,s}$ of the drive machine 4 specified at the gas pedal (not shown) continue to remain constant during this. By contrast however, the actual value $n_{M,i}$ of the revolution rate $n_M$ of the second hydraulic machine 6 and the actual value $n_{A,i}$ of the drive machine 4 increase because of the acceleration that is acting owing to gravity. A limit value S1 for the deviation $(n_{M,i}-n_{M,c})$ for a first switch-on criterion and a limit value S2 for a deviation $(n_{A,i}-n_{A,s})$ for a second switch-on criterion are stored in the control unit 40. If both deviations $(n_{M,i}-n_{M,c})$, $(n_{A,i}-n_{A,s})$ exceed the associated limit values S1, S2, as is the case for both by chance in the example shown at the point in time $t_2$, the control unit 40 intervenes and "switches" a hydraulic braking torque $M_B$ "on". At the point in time $t_2$, the control unit 40 determines that on the one hand a hydraulic slip of the second hydraulic machine 6 is too large and that moreover the drive machine 4 is turning too rapidly. It is also conceivable that under certain circumstances or for certain machines fitted with the traction drive according to the disclosure, only exceeding the one limit value or only exceeding the other limit value or exceeding one of the two limit values results in an intervention by the control unit 40 and a hydraulic braking torque being "switched on". That both conditions must be fulfilled appears particularly favorable however, and in most application cases is a guarantee that braking is only initiated when desired. I.e., if only limit value S1 is exceeded, then the triggering of braking may not be desired even if there is a relatively large hydraulic slip but the diesel engine does not significantly exceed its target revolution rate. If only limit value S2 is exceeded, then the triggering of braking may not be desired if for example there is a significant positive revolution rate difference $(n_{A,i}-n_{A,s})$ as a result of the influence of the working hydraulics or during rapid reduction of the target diesel revolution rate, but the vehicle is not in the braking state.

The control unit 40 now performs the task of providing the hydrostatic braking torque $M_B$ by automatically controlling the adjustment devices 16, 18, i.e. independently of the operator. For this purpose, it first controls the adjustment devices 16, 18 in a brief period of time between $t_2$ and $t_3$ such that the displacement volumes $V_{P,i}$ and $V_{M,i}$ of both hydraulic machines 2, 6, are reduced simultaneously while maintaining a hydraulic transmission ratio. The objective is initially in said period of time to produce a neutral drive state, in which neither driving nor braking occurs, and to prevent torque peaks from acting on the drive machine 4. Said transition is parameterized in the control unit 40.

From point in time $t_3$ the control unit increases the displacement volume (feed volume) $V_{M,i}$ of the second hydraulic machine 6 further. Because said second hydraulic machine 6 is operating in pumping mode during the overrun mode, the return volumetric flow that it delivers by means of the second branch line 22 to the first hydraulic machine 2 increases accordingly. At the same time the displacement volume (volumetric displacement) $V_{P,i}$ of the first hydraulic machine 2 is already reduced so much however, that the same cannot receive the full return volumetric flow. As a result the pressure in the second branch line 22 rises until the pressure relief valve 34 opens and pressure medium is released into the tank T or into the first branch line 20. The braking torque $M_B$ results from the partial flow discharging via the pressure relief valve 34 and the pressure difference and the braking energy is released in order to the drive machine 4.

Once there is a drive state in the further profile, in which the value is below the limit value S1, the previously described intervention of the control unit 40 ends and the braking is deactivated. This is the case for example at point in time $t_4$ according to FIG. 2. In other versions the deviation $(n_{A,i}-n_{A,s})$ could also be used to deactivate the braking. A switch-off criterion could be if the deviation falls below a limit value S3. Here S3 is somewhat smaller than the switch-on criterion S2 associated with the deviation $(n_{A,i}-n_{A,s})$. The switch-off criterion could also be that either the deviation $(n_{M,i}-n_{M,c})$ or the deviation $(n_{A,i}-n_{A,s})$ or one of the two deviations falls below a limit value. However, it appears to be particularly favorable to use the deviation $(n_{M,i}-n_{M,c})$ as the switch-off criterion.

Based on the definition for the volumetric efficiency level $\eta_P$ of the first hydraulic machine 2 and $\eta_M$ of the second hydraulic machine 6

$$\eta_P=n_{P,c}/n_{P,i}, \text{ and } \eta_M=n_{M,i}/n_{M,c}$$

the actual value $n_{M,i}$ of the revolution rate $n_M$ of the second hydraulic machine 6 (motor) in the driving case, i.e. in the traction mode of the traction drive 1, is below the theoretical value $n_{M,c}$ of the revolution rate $n_M$ with $$n_{M,i}=n_{M,c}\eta_M\eta_P$$

and is above the theoretical value $n_{M,c}$ of the revolution rate $n_M$ in the braking case, i.e. in the overrun mode, with $$n_{M,i}=n_{M,c}1/\eta_M 1/\eta_P.$$

Because volumetric losses of the respective hydraulic machine 2, 6 among other things increase approximately in proportion to a pressure difference across the respective hydraulic machine 2, 6, the deviation $(n_{M,i}-n_{M,c})$ between the theoretical value $n_{M,c}$ and the actual value $n_{M,i}$ of the revolution rate $n_M$ of the second hydraulic machine 6 is at the same time an indicator of the magnitude of the currently driving or decelerating torque M on the second hydraulic machine 6.

A function $$M_B=k(n_{M,i}-n_{M,c})$$

is stored in the control unit 40, by means of which depending on the deviation $(n_{M,i}-n_{M,c})$ the braking torque $M_B$ is determined that can be automatically produced by means of the control unit 40 by controlling the adjustment devices 16, 18 as described. Here k is a constant. In the exemplary embodiment shown, the control by the control unit 40 is carried out solely based on the deviation $(n_{M,i}-n_{M,c})$ and/or on the deviation $(n_{A,i}-n_{A,s})$ and regardless of whether the operator has demanded braking by means of the brake operating pedal 44. However, if the operator intervenes in braking, then because of the mechanical braking effect the switch-off criterion S1 or S3 would of course be reached at an earlier point in time and the intervention according to the disclosure by the control unit would end before point in time $t_4$.

Furthermore, the fact that the revolution rate $n_{A,i}$ of drive machine 4 lies below its target value $n_{A,c}$ in the driving case and lies above its target value $n_{A,c}$ in the braking case can be used.

A hydrostatic traction drive is disclosed with two hydraulic machines disposed in a closed hydraulic circuit, of which one is provided for driving a wheel or a chain or an axle. A difference between an actual revolution rate of said hydraulic machine and a theoretical revolution rate of said hydraulic machine that is determined under the assumption of no losses can be determined by means of a control unit of the traction drive. A driving state of the traction drive, in particular an overrun mode or a traction mode or an idle mode, can be identified by means of the control unit depending on the deviation and a braking torque of the traction drive can be controlled depending on the identified driving state.

Furthermore, a method for controlling the braking torque of the traction drive is disclosed.

REFERENCE CHARACTER LIST 1 hydrostatic traction drive
2 first hydraulic machine
4 drive machine
6 second hydraulic machine
8 drive shaft
10 differential
12 wheel
14 axle
16, 18 adjustment device
20 first branch line
22 second branch line
24 drive shaft
26 feed pump
28 feed line
30, 32, 34 pressure relief valve
36, 38 anti-suckback valve
40 control unit
42 signal line
44 brake operating pedal
46 sensor
48, 50, 52 signal line
54 revolution rate detection unit
56 memory unit
58 processor unit
60 revolution rate detection unit
62 signal line

What is claimed is:

1. A hydrostatic traction drive, comprising:
a first hydraulic machine with a variable displacement volume, the first hydraulic machine configured to be coupled to a drive machine;
a second hydraulic machine with a variable displacement volume, the second hydraulic machine configured to be coupled to a wheel to be driven or to a chain or axle to be driven, the first and second hydraulic machines fluidically connected by a first branch line and a second branch line; and
a control unit configured to:
determine an overrun mode of the traction drive depending on a measured actual value of a revolution rate of the second hydraulic machine and on a calculated theoretical value of the revolution rate of the second hydraulic machine, the theoretical value calculated based on a measured actual value of a revolution rate of the first hydraulic machine;
control a braking torque of the traction drive depending on the determined overrun mode;
in response to determining that the traction drive is in the overrun mode, reduce the displacement volume of the first hydraulic machine and the displacement volume of the second hydraulic machine, such that a ratio between the displacement volume of the first hydraulic machine and the displacement volume of the second hydraulic machine is maintained, until the traction drive is in a neutral drive state; and
in response to the traction drive entering the neutral drive state, increase the displacement volume of the second hydraulic machine.

2. The traction drive according to claim 1, wherein the braking torque is configured to be produced by restricting a partial flow of a return volumetric flow directed from the second hydraulic machine to the first hydraulic machine.

3. The traction drive according to claim 2, further comprising a hydraulic restriction mechanism having a pressure medium input and a pressure medium output, the pressure medium input fluidically connected to a branch line and the pressure medium output fluidically connected to a pressure medium sink of the traction drive.

4. The traction drive according to claim 1, wherein the control unit is configured to determine the overrun mode based on the actual value of the revolution rate of the second hydraulic machine deviating from the theoretical value of the revolution rate by more than a predetermined threshold amount.

5. The traction drive according to claim 4, wherein the control unit is further configured to determine the overrun mode based on an actual value of a revolution rate of the drive machine deviating from a target value for the drive machine by more than a predetermined threshold.

6. The traction drive according to claim 1, wherein the theoretical value is a theoretical loss-free value of revolution speed for the second hydraulic machine.

7. The traction drive according to claim 1, wherein the control unit is further configured to determine the theoretical value depending on a ratio of actual values of displacement volumes of the hydraulic machines.

8. The traction drive according to claim 1, wherein the control unit is configured to determine for at least one of the hydraulic machines an actual value of its displacement volume depending on a target value of its displacement volume.

9. The traction drive according to claim 8, wherein a characteristic field of the actual value of the displacement volume is stored in the control unit as a function of the target value of the displacement volume.

10. The traction drive according to claim 1, further comprising one or more of (i) a first revolution rate detection unit configured to detect the measured actual value of the revolution rate of the first hydraulic machine or a revolution rate that is configured to be derived therefrom and (ii) a second revolution rate detection unit configured to detect the actual value of the revolution rate of the second hydraulic machine.

11. A method for controlling a braking torque of a hydrostatic traction drive including a first hydraulic machine with a variable displacement volume and a second hydraulic machine with a variable displacement volume, the method comprising:
determining an overrun mode of the traction drive depending on a measured actual value of a revolution rate of the second hydraulic machine and on a calculated theoretical value of the revolution rate, the theoretical value calculated based on a measured actual value of a revolution rate of the first hydraulic machine;
controlling the braking torque depending on the determined overrun mode;
in response to determining that the traction drive is in the overrun mode, reducing the displacement volume of the first hydraulic machine and the displacement volume of the second hydraulic machine, such that a ratio between the displacement volume of the first hydraulic machine and the displacement volume of the second hydraulic machine is maintained, until the traction drive is in a neutral drive state; and
in response to the traction drive entering the neutral drive state, increasing the displacement volume of the second hydraulic machine.

12. The method according to claim 11, wherein determining the overrun mode of the traction drive includes:

determining that a deviation of the actual value of the revolution rate of the second hydraulic machine from the theoretical value of the revolution rate is greater than a predetermined threshold amount.

13. The method according to claim 12, wherein determining the overrun mode of the traction drive further includes, prior to the determining that a deviation of the actual value of the revolution rate of the second hydraulic machine from the theoretical value of the revolution rate is greater than the predetermined threshold amount:

measuring the actual value of the revolution rate of the second hydraulic machine, and calculating the theoretical value of the revolution rate.

14. The method according to claim 13, wherein calculation of the theoretical value of the revolution rate is further based on a ratio of actual values of displacement volumes of the hydraulic machines.

15. The method according to claim 12, wherein determining the overrun mode of the traction drive further includes:

determining that a deviation of an actual value of a revolution rate of the drive machine from a target value for the drive machine is more than a predetermined threshold.

16. The method according to claim 11, wherein controlling the braking torque depending on the determined overrun mode includes:

adjusting at least one of the displacement volumes of the hydraulic machines.

* * * * *